(12) United States Patent
Muller et al.

(10) Patent No.: US 7,487,709 B2
(45) Date of Patent: Feb. 10, 2009

(54) ADJUSTABLE-LENGTH ACTUATING ELEMENT

(75) Inventors: Herbert Muller, Nuremberg (DE); Markus Happich, Feucht (DE)

(73) Assignee: Suspa Holding GmbH, Altdorf (DE)

( * ) Notice: Subject to any disclaimer, the term of this patent is extended or adjusted under 35 U.S.C. 154(b) by 1299 days.

(21) Appl. No.: 10/661,546

(22) Filed: Sep. 15, 2003

(65) Prior Publication Data

US 2004/0084265 A1 May 6, 2004

(30) Foreign Application Priority Data

Nov. 2, 2002 (DE) ................................ 102 51 009
Jul. 4, 2003 (DE) ................................ 103 30 176

(51) Int. Cl.
*F01B 3/00* (2006.01)
*F01B 9/00* (2006.01)
(52) U.S. Cl. .......................................... 92/114; 92/136
(58) Field of Classification Search ........................ 92/2, 92/3, 113, 114, 136, 137
See application file for complete search history.

(56) References Cited

U.S. PATENT DOCUMENTS

| 6,516,567 | B1* | 2/2003 | Stone et al. | 49/343 |
| 7,159,699 | B1* | 1/2007 | Tine, Jr. | 188/282.4 |
| 7,320,198 | B2* | 1/2008 | Berklich et al. | 49/343 |

FOREIGN PATENT DOCUMENTS

| DE | 694 14 363 | 4/1999 |
| DE | 299 19 212 | 2/2000 |
| DE | 299 19 214 | 2/2000 |
| DE | 100 18 811 | 10/2001 |

* cited by examiner

*Primary Examiner*—Michael Leslie
(74) *Attorney, Agent, or Firm*—Browdy and Neimark, P.L.L.C.

(57) ABSTRACT

An adjustable-length actuating element comprises an energy storing device. A casing and a piston rod, which is displaceable in the casing, are provided within the actuating element. A spindle drive is integrated in the energy storing device. A driving shaft is in rotary driving connection with the piston rod.

15 Claims, 9 Drawing Sheets

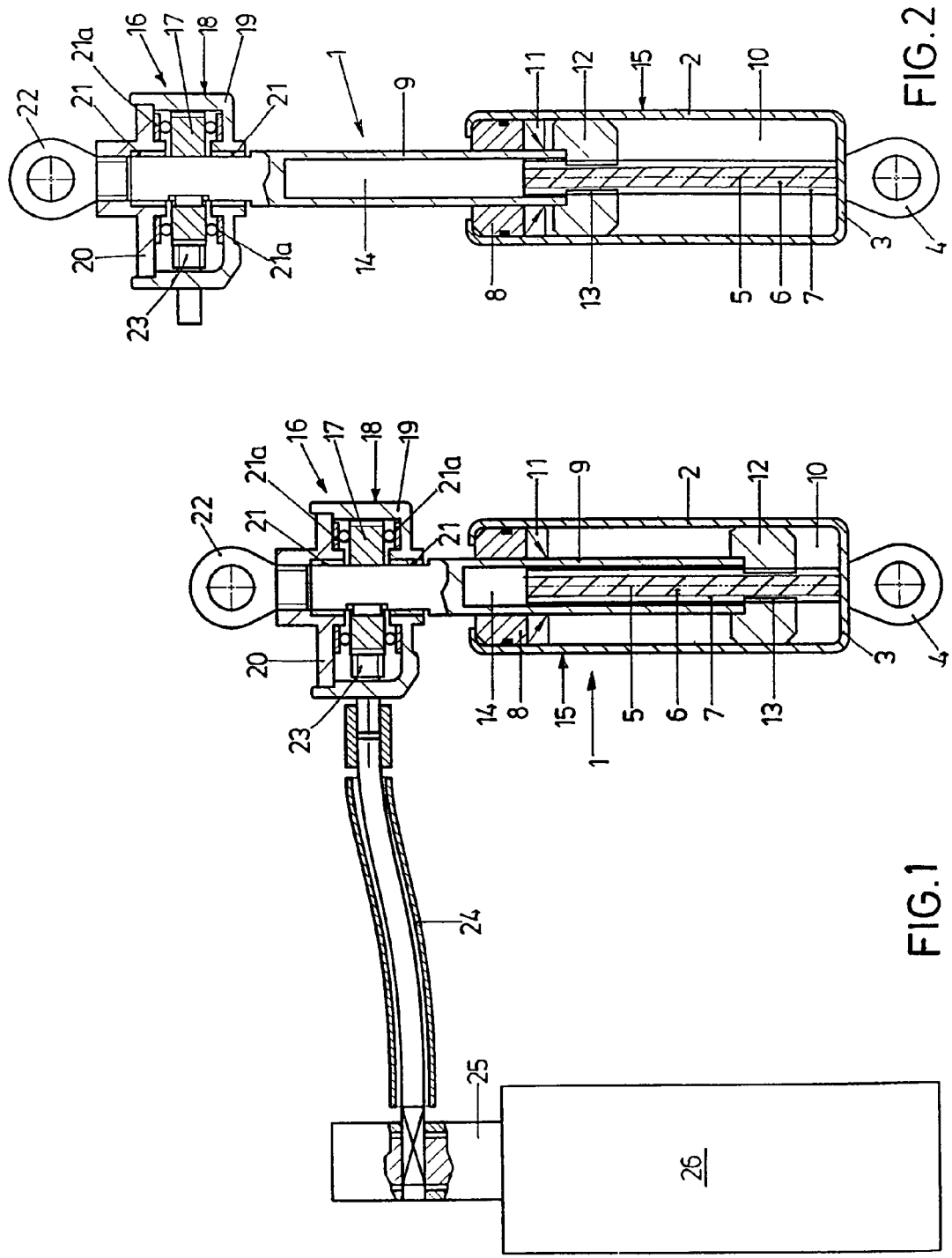

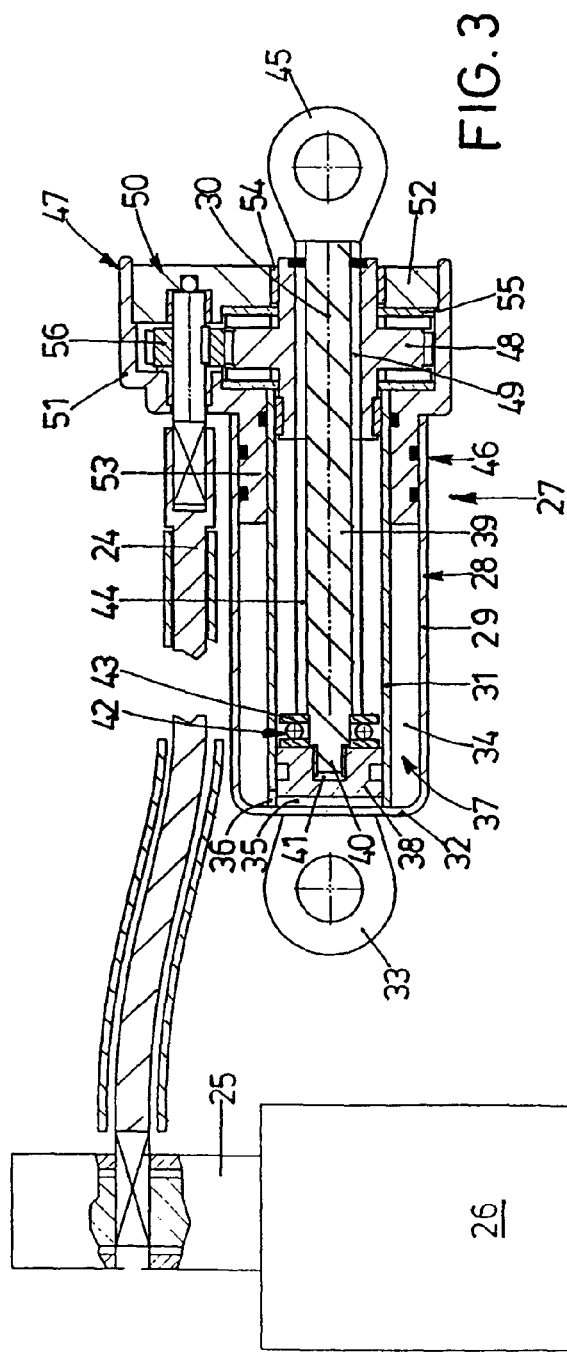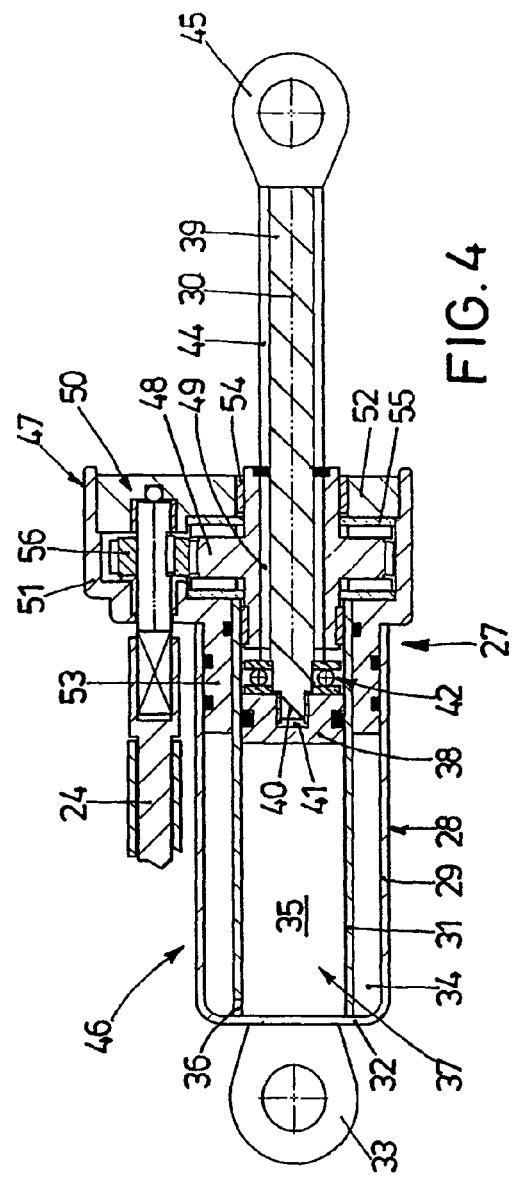

ADJUSTABLE-LENGTH ACTUATING ELEMENT

BACKGROUND OF THE INVENTION

1. Field of the Invention

The invention relates to an adjustable-length actuating element.

2. Background Art

Lots of applications exist where to use actuating elements, a first end of which is held while a second end is movable relative to the first end for movable parts to be adjusted one relative to the other. These parts may for instance be trunk lids of passenger vehicles or the heavier flaps of bays. Further fields of possible application include elevating table tops or tops of workbenches.

DE 100 18 811 A1 describes a length-adjusting device which comprises two cross arms that are adjustable one in relation to the other. A skid with an electric motor disposed thereon is provided between the cross arms; the skid is displaceable relative to the cross arms. Spindle drives, which are provided in pairs, are driven by the motor, namely two spindle drives at a time via a single joint driving gear. The spindle drives serve for adjusting the distance of the cross arms.

SUMMARY OF THE INVENTION

It is an object of the invention to embody an adjustable-length actuating element of compact structure, needing comparatively little driving power and driving torque.

According to the invention, this object is attained in an adjustable-length actuating element, comprising an energy storing device; a casing; a piston rod which is extended from the casing and movable relative thereto and has an external end; a first fastening element on the end of the casing opposite to where the piston rod exits; and a second fastening element on the external end of the piston rod; a spindle drive which is integrated in the energy storing devices and disposed between the casing and the piston rod; and a driving shaft, which is in rotary driving connection with the piston rod. Integrating the spindle drive in the energy accumulator helps create a rather compact structure. The energy accumulator aiding in the actuating motion in a single direction—as a rule the direction of piston rod extension—the drive required for rotary actuation—as a rule an electric motor—may be correspondingly small. However, manual operation is always possible just as well.

An advantageous embodiment of rotary driving connection between the driving shaft and piston rod resides in that a gear is provided between the driving shaft and the piston rod.

Advantageous embodiments of the gears reside in that the gear is a worm gear and in that the gear is a toothed gear. In keeping with advantageous arrangements of the gears, provision is made for the gear to be axially tightly joined to the piston rod and for the gear to be axially tightly joined to the casing.

In keeping with advantageous embodiments which ensure overload protection, it is provided that the spindle drive and/or the gear are self locking; that an overload clutch is provided in the rotary driving connection; and that the overload clutch is a slip clutch.

Further features, advantages and details of the invention will become apparent from the ensuing description of exemplary embodiments of the invention, taken in conjunction with the drawing.

BRIEF DESCRIPTION OF THE DRAWING

FIG. 1 is a longitudinal sectional view of a first embodiment of an adjustable-length actuating element in a retracted condition;

FIG. 2 is a view of the actuating element of FIG. 1 in an extended condition;

FIG. 3 is a longitudinal sectional view of a second embodiment of an actuating element in a retracted condition;

FIG. 4 is a view of the actuating element of FIG. 3 in an extended condition;

DESCRIPTION OF PREFERRED EMBODIMENTS

Figure 5:
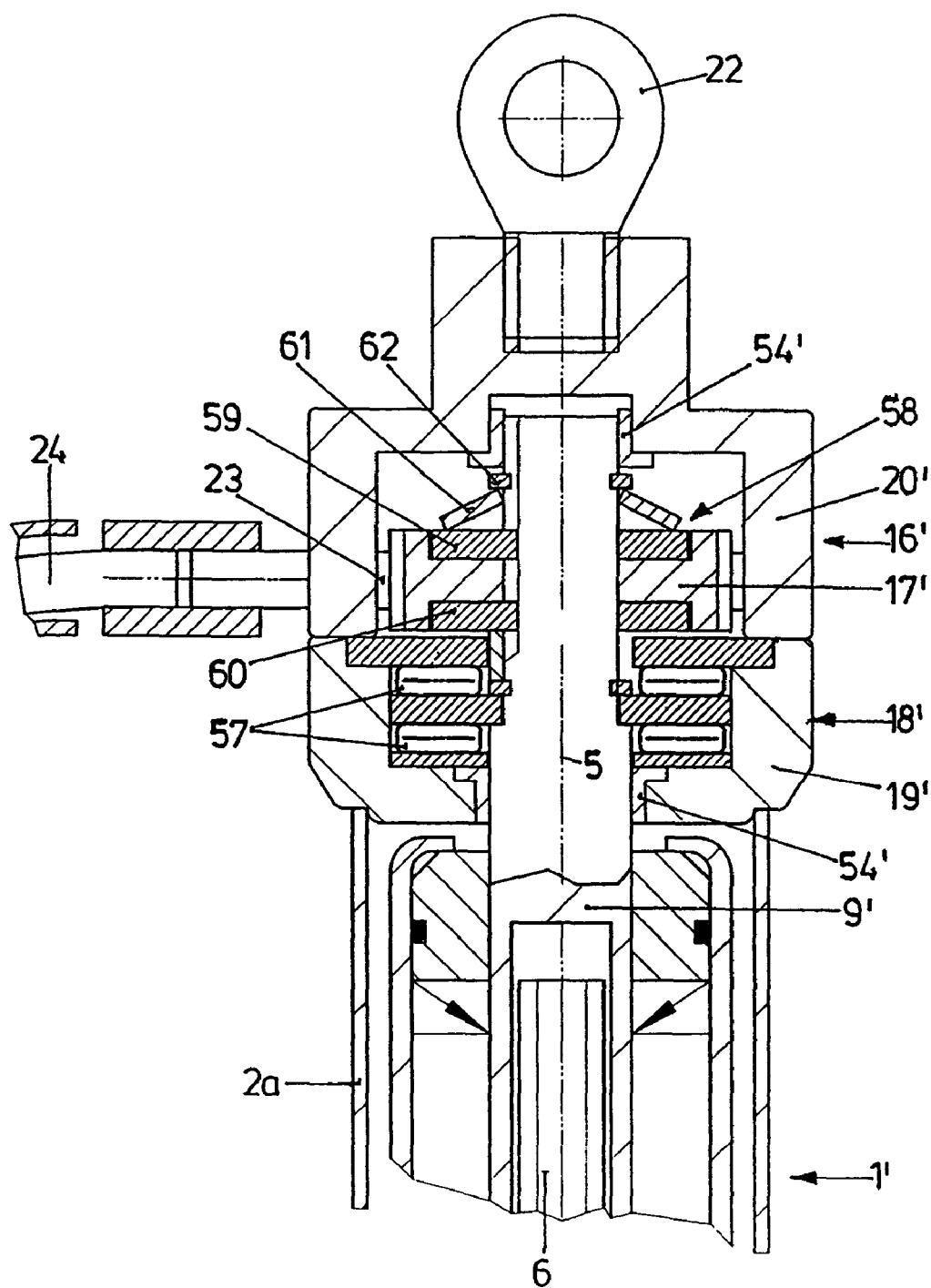
FIG. 5 is a partial view of a longitudinal section of an actuating element according to FIGS. 1 and 2 with overload protection.

The actuating element 1 seen in FIGS. 1 and 2 includes a cylindrical casing 2; a fastening element 4 is attached to the end of the casing 2 that is closed by a bottom 3. A threaded spindle 6 with an external thread 7 is mounted on the bottom 3 concentrically of the central longitudinal axis 5 of the casing 2.

At the end opposite the bottom 3, the casing 2 is sealed by a piston-rod guide 8. Concentrically of the axis 5, a piston rod 9 is extended out of the casing 2 through this guide 8. The interior space 10 of the casing 2 is filled with pressurized gas; it is externally sealed by a seal 11 which bears against the guide 8, sealing in particular towards the piston rod 9. A piston 12, which is not sealed towards the casing 2, is mounted axially tightly and non-rotatably on the end, inside the interior space 10, of the piston rod 9. The piston 12 has an internal thread 13 which receives the external thread 7 of the spindle 6. The piston rod 9 is provided with a cavity 14 of such a design that it can receive the spindle 6 when the piston rod 9 is entirely retracted into the casing 2 (see FIG. 1). The piston rod 9 and the piston 12 can also be formed in a single piece. In this case, the internal thread 13 would be on the inner wall of the piston 12 i.e., in the cavity 14 thereof. The described unit is a gas spring 15, the piston rod 9 of which rotates relative to the casing 2 upon retraction or extension.

The end, outside the casing 2, of the piston rod 9 is provided with a worm gear 16, the worm wheel 17 of which is non-rotatably joined to the piston rod 9. The worm gear 16 has a gear casing 18 which comprises a cup-shaped casing member 19 and a cover-type casing member 20, the two being tightly united for instance by pressing. The gear casing 18 is disposed on the piston rod 9 for rotation by means of radial bearings 21, supporting itself on the worm wheel 17 by thrust bearings 21a. A fastening element 22 is mounted on the cover-type casing member 20. A worm 23 is rotatable in the cup-shaped casing member 19, engaging with the worm wheel 17; the worm 23 is non-rotatably joined to a flexible shaft 24. The other end of the shaft 24 is non-rotatably coupled with a drive, for instance in the form of a reducing gear 25, of an electric motor 26. Depending on structural conditions, the shaft 24 may of course also be rigid.

When the motor 26 is driven, the piston rod 9, together with the piston 12, is driven in rotation by way of the flexible shaft 24 and the worm gear 16 as a result of which—depending on the direction of rotation—they move along the spindle 6 into, or out of, the casing 2. The piston-rod-9 motion of extension is supported by the gas pressure that acts on the cross-section of the piston rod 9.

Preferably, the thread connection between the threaded spindle 6 and the internal thread 13 of the piston 12 is not self-locking. If, additionally, the worm gear 16 and the motor 26 are not self-locking, the piston rod 9 can be moved relative to the casing 2 when overload acts on the actuating element in the direction of pull or pressure.

In the embodiment according to FIGS. 3 and 4, an actuating element 27 is provided, equally having a cylindrical casing 28. The casing 28 comprises a cylindrical exterior tube 29 and an interior tube 31 that is disposed therein concentrically of a common central longitudinal axis 30. One end of the exterior tube 29 is closed by a bottom 32, on which is mounted a fastening element 33. The annular space 34 formed between the exterior tube 29 and the interior tube 31 and the space 35 defined by the interior tube 31 are connected with each other by a connecting hole 36 which is formed in the vicinity of the bottom 32 in the interior tube 31; they constitute an interior space 37 that is filled with compressed gas. The annular space 34 is externally sealed and gas-tight in a manner still to be described.

A piston 38 is displaceable in the direction of the axis 30 inside, and sealed towards, the interior tube 31, defining the space 35 and, consequently, the interior space 37. A piston rod 39 rotatably supports itself on the piston 38. To this end, the piston rod 39 has a bearing pin 40 which supports itself on a bearing hole 41 of the piston 38 for rotation, but in a non-displaceable fashion radially of the axis 30. The piston rod 39 is rotatably supported on the piston 38 by way of an axial rolling bearing 42. A bearing plate 43 of the bearing 42 is axially tightly joined to the piston rod 39 i.e., it is non-displaceable. The piston rod 39 has an external thread 44 substantially over its entire length. The piston rod 39 simultaneously has the function of a threaded spindle. A fastening element 45 is mounted on the piston rod 39 at the end outside the casing 28. The unit specified so far constitutes a gas spring 46.

A toothed gearing 47 is provided at the end of the casing 28 that faces away from the bottom 32, the frontal gearwheel 48 thereof being mounted by means of an internal thread 49 on the external thread 44 of the piston rod 39. The gearing 47 comprises a gear casing 50 which is composed of a cup-shaped casing member 51 and a cover-type casing member 52. The cup-shaped casing member 51 has an annular cylindrical sealing member 53 by means of which to implement the outward gas-tight sealing mentioned, of the annular space 34. The cup-shaped casing member 51 is non-rotatably and axially tightly joined to the casing 28, for example by pressing. The cover-type casing member 52 is axially tightly and non-rotatably joined to the cup-shaped casing member 51, for example by pressing. The frontal gearwheel 48 is mounted by means of radial and thrust bearings 54, 55 for free rotation relative to the casing 28 and the gear casing 50. A pinion 56, which engages with the frontal gearwheel 48, is located in the gear casing 50; it is non-rotatably joined to a flexible shaft 24 which is coupled with a motor 26 in the way already described.

Upon actuation of the motor 26, the frontal gearwheel 48 is rotated by way of the pinion 56. Since the piston rod 39, which acts as a threaded spindle, and the casing 28 are non-rotatable when incorporated, the piston rod 39 is pushed out of, or retracted into, the casing 28. The pressure of the compressed gas on the full cross section of the piston 38 aids in the motion of extension. With the flexible shaft 24 being parallel and in direct vicinity to the casing 28, this actuating element 27 saves a lot of space when installed.

The toothed gearing 47 is not self-locking. In this case too, the threaded connection between the external thread 44 and internal thread 49 is not self-locking for the piston rod 39, upon overload occurring between the fastening elements 45 and 33, to be able to retract into the casing 28 even if the motor 26 is not actuated.

Fundamentally it is conceivable to make the threaded connection and torque linkage to the motor 26 self-locking, in which case a slip clutch is appropriately provided. FIG. 5 illustrates an alternative of an actuating element as seen in FIGS. 1 and 2. This actuating element 1' differs from the embodiment of FIGS. 1 and 2 by the design of the worm gear 16'. In as much as identical parts are available, the same reference numerals are used as in FIGS. 1 and 2; if components are available that are functionally identical, but differ in construction, the same reference numerals are used, however provided with a prime. The gear casing 18' is composed of two casing members 19', 20' which are non-rotatably united, with the piston rod 9' being rotary in relation thereto. The gear casing 18' is rotatably but axially tightly joined to the piston rod 9' by means of two axial rolling bearings 57.

The worm wheel 17' is not directly non-rotatably joined to the piston rod 9', but—by departure from the embodiment according to FIGS. 1 and 2—it is joined to the piston rod 9' by way of a slip clutch 58. The slip clutch 58 has clutch disks 59, 60 on either side of the worm wheel 17', one clutch disk 60 of which that is turned towards the bearings 57 and the gas spring 15 being disposed, relative to the piston rod 9', axially tightly in the direction of the gas spring 15. Both clutch disks 59, 60 are non-rotatably joined to the piston rod 9'; the clutch disk 59 that is turned towards the cover-type casing member 20' and the worm wheel 17' are displaceable relative to the piston rod 9' in the direction of the axis 5. The latter clutch disk 59 is loaded by a prestressed disk spring 61 which supports itself on an abutment 62 that is mounted on the piston rod 9'.

The function of the actuating element 1' of FIG. 5 largely corresponds to that of FIGS. 1 and 2. Torque transmission does not take place directly from the worm wheel 17' to the piston rod 9—as in FIGS. 1 and 2—but non-positively via the slip clutch 58 to the piston rod 9'. When torque acts on the slip clutch 58, exceeding the torque that is given by the preload of the disk spring 61 and the conditions of friction between the worm wheel 17' and the clutch disks 59, 60, this non-positive connection is released and the piston rod 9' can rotate relative to the worm wheel 17', thus avoiding overload. A protecting tube 2a is mounted on the lower casing member 19'.

Figure 6:
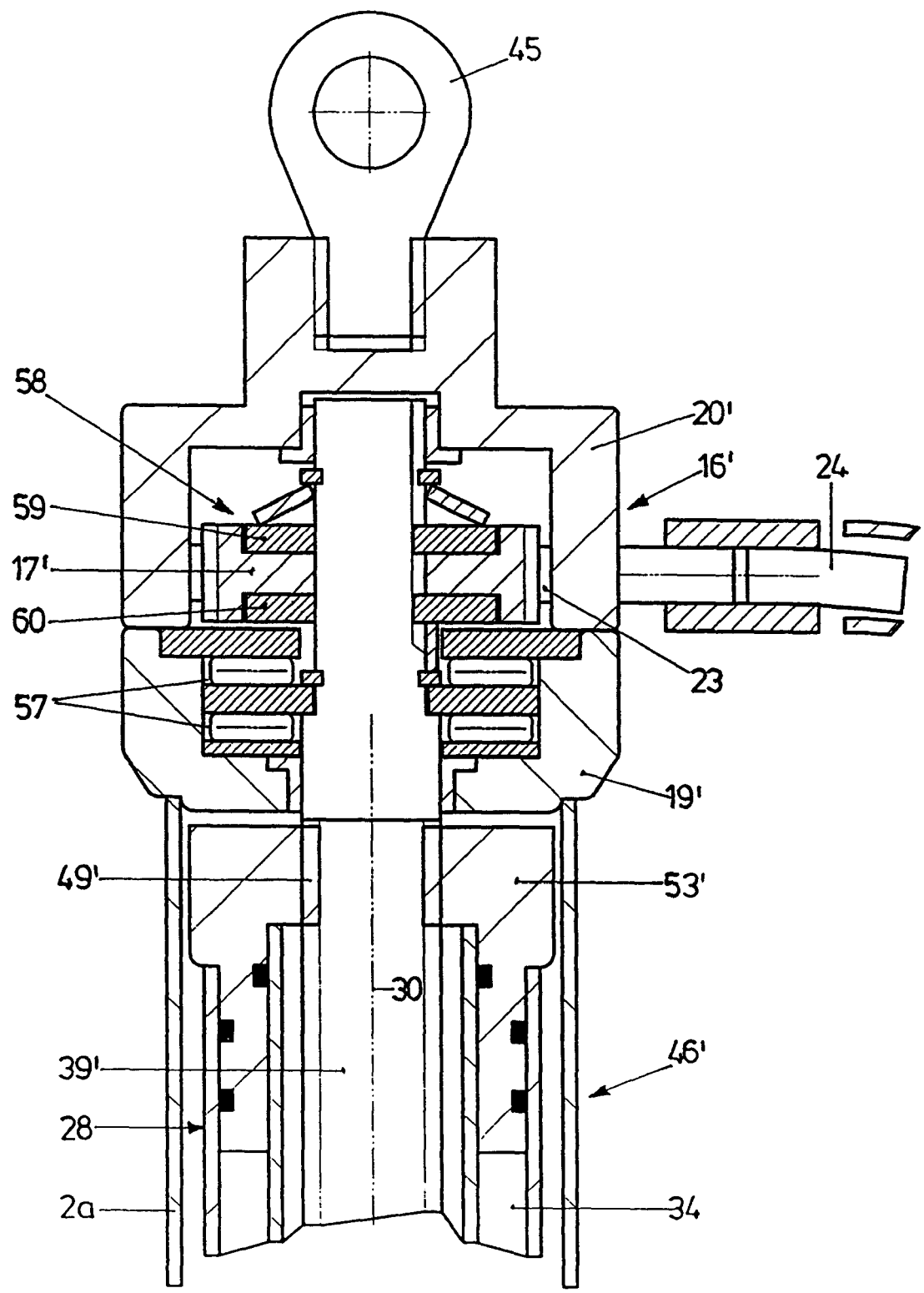
FIG. 6 is a partial view of a longitudinal section of an actuating element according to FIGS. 3 and 4 with overload protection.

FIG. 6 illustrates an exemplary embodiment having a double-tube gas spring 46' that corresponds basically to the gas spring of FIGS. 3 and 4; and a worm gear 16' with a slip clutch 58 according to FIG. 5. Therefore, the reference numerals of the figures already described are used without renewed description. The gas spring 46' differs from the gas spring 46 of FIGS. 3 and 4 only in that the sealing member 53' of the annular space 34 and the cup-shaped casing member 19' are not integral, but separate members. The internal thread 49' is located in the sealing member 53' which is fixed non-rotatably relative to the casing 28. In this embodiment, the worm gear 16' migrates along with the piston rod 39' as it is retracted and extended, because the worm gear 16' is fixed relative to the piston rod 39' in the direction of the axis 30. In particular in this embodiment it is of advantage if the piston rod 39 is supported on the piston 38 for rotation by way of the axial rolling bearing 42.

Figure 7:
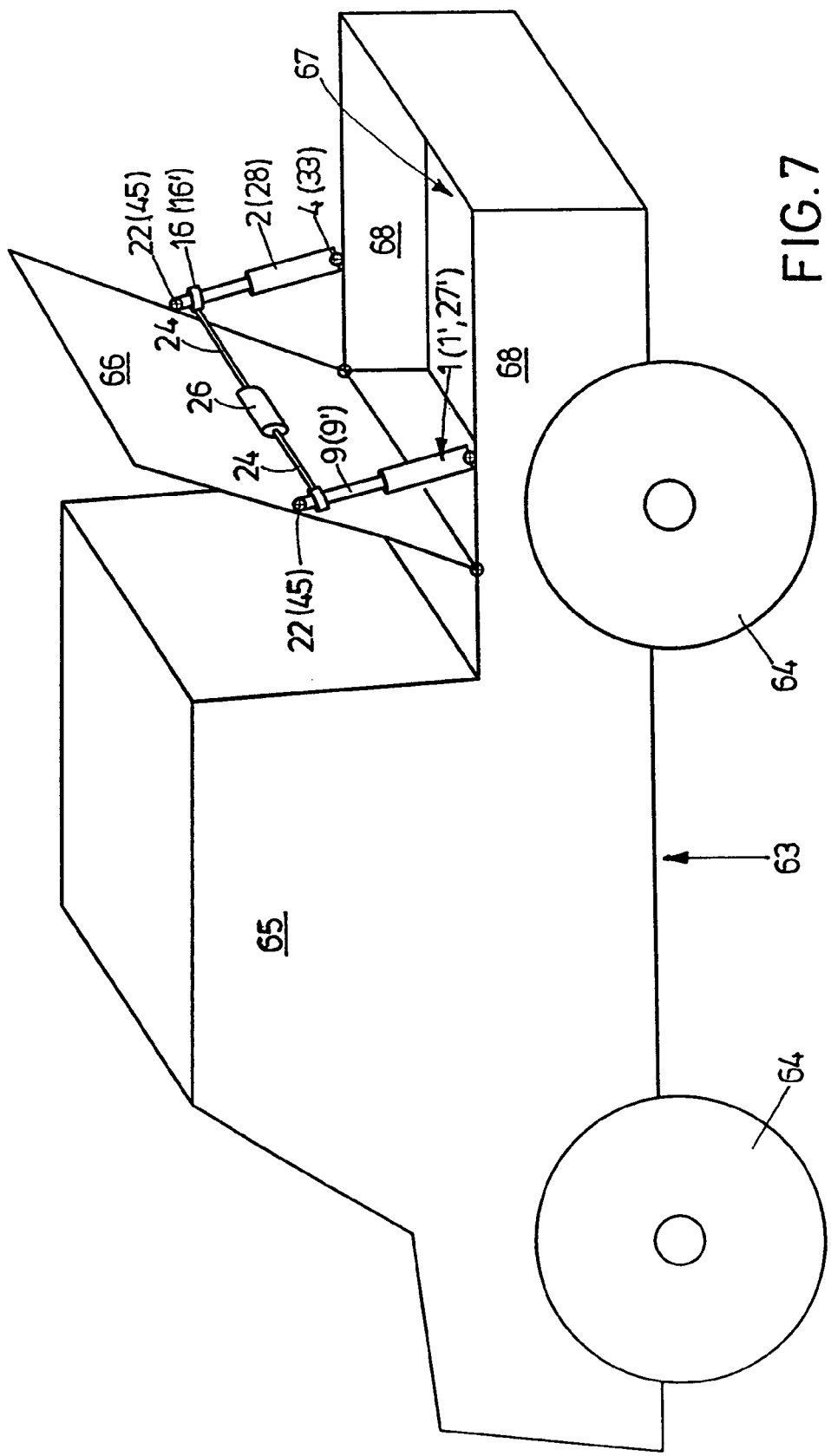
FIG. 7 is an illustration of a motor vehicle with actuating elements according to the embodiments of FIGS. 1, 2, 5, 6.
Figure 8:
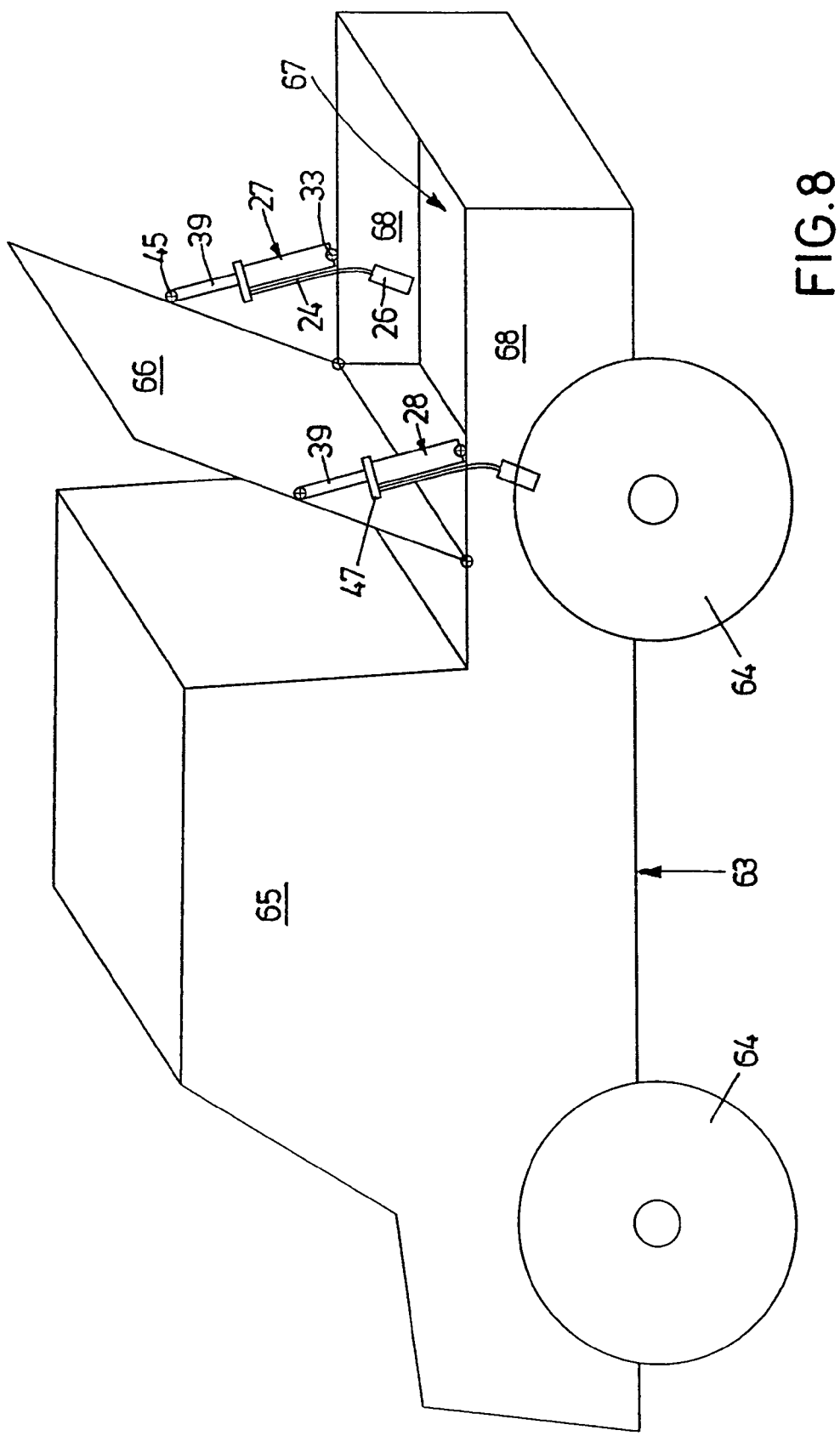
FIG. 8 is an illustration of a motor vehicle with actuating elements according to FIGS. 3 and 4.

FIGS. 7 and 8 illustrate examples of installation of the actuating elements 1, 1' and 27, 27'. They are used in motor vehicles 63 which support themselves by wheels 64 on the ground and have a driver's cab 65 and a trunk 65 that is closed by a flap 66. The vehicles may be passenger cars with a luggage trunk or small trucks or the like.

In the embodiment of FIG. 7, provision is made for actuating elements 1 or 1' or 27' which are operated by a joint motor 26 that is mounted on the flap 66. The casings 2 and 28 are articulated to the respective side wall 68 of the trunk 67 by means of fastening elements 4 and 33, while the fastening elements 22 and 45 are articulated to the flap 66. Of course, inverted installation is possible so that the motor 26 or two motors 26 may be located anywhere on the vehicle.

In the case of use according to FIG. 8, provision is made for actuating elements 27, the fastening elements 33 of which are articulated to the respective side wall 68, while the fastening elements 45 that are formed on the piston rod 39 are articulated to the flap 66. In this case too, the installation may be inverted.

Figure 9:
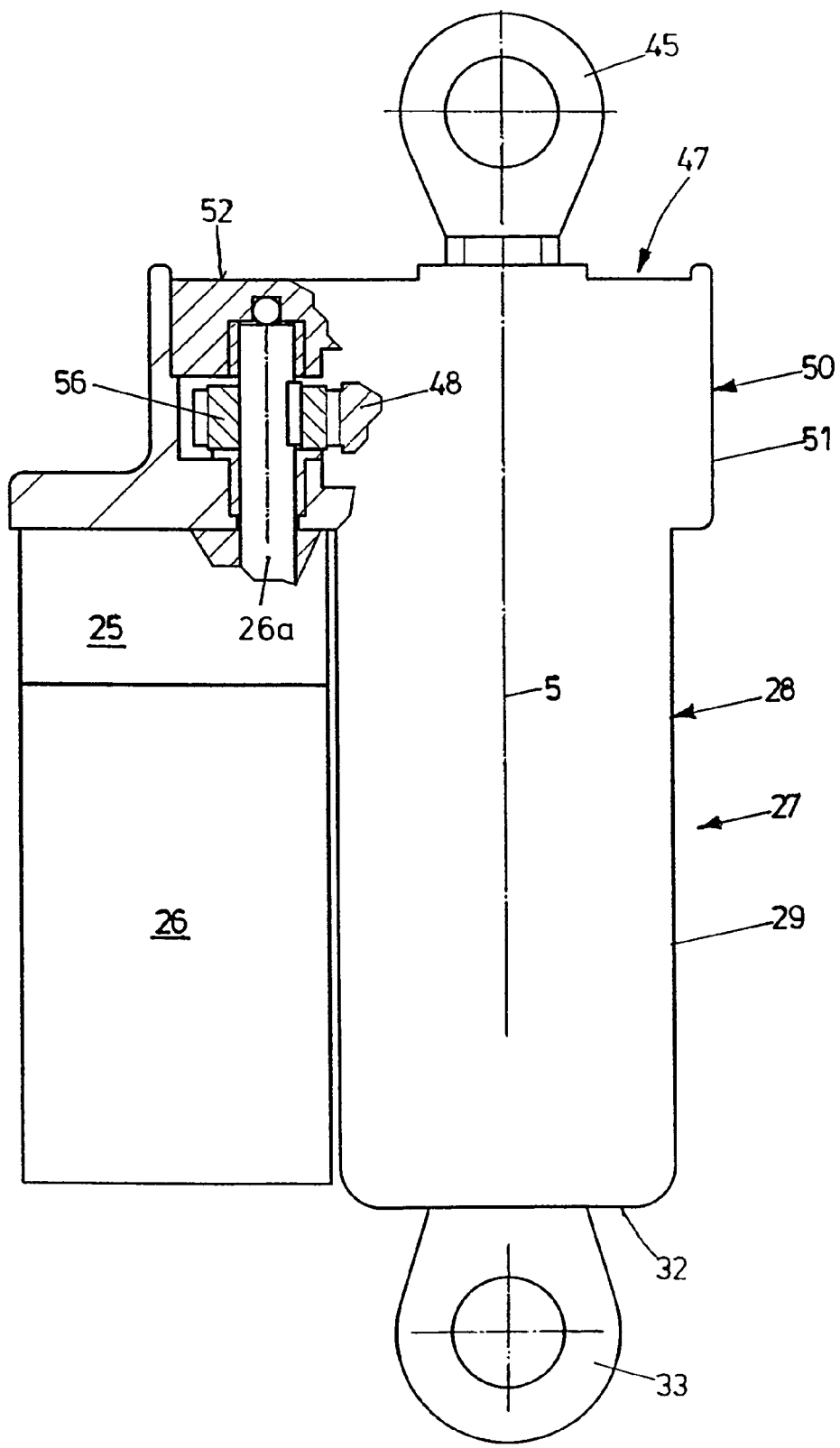
FIG. 9 is a view of a modified version of the second embodiment with an electric motor arranged directly on the actuating element.

As seen in FIG. 9 for completion, the motor 26 can also be fixed directly to the actuating element 27. In this regard, the driven shaft 26a of the motor 26 simultaneously serves as a driving shaft 26a. The driven shaft 26a of the electric motor 26 or, respectively, of the reducing gear 25 downstream thereof is directly connected with the pinion 56 of the toothed gearing 47. Possibilities of installation result from the space that is available.

Figure 10:
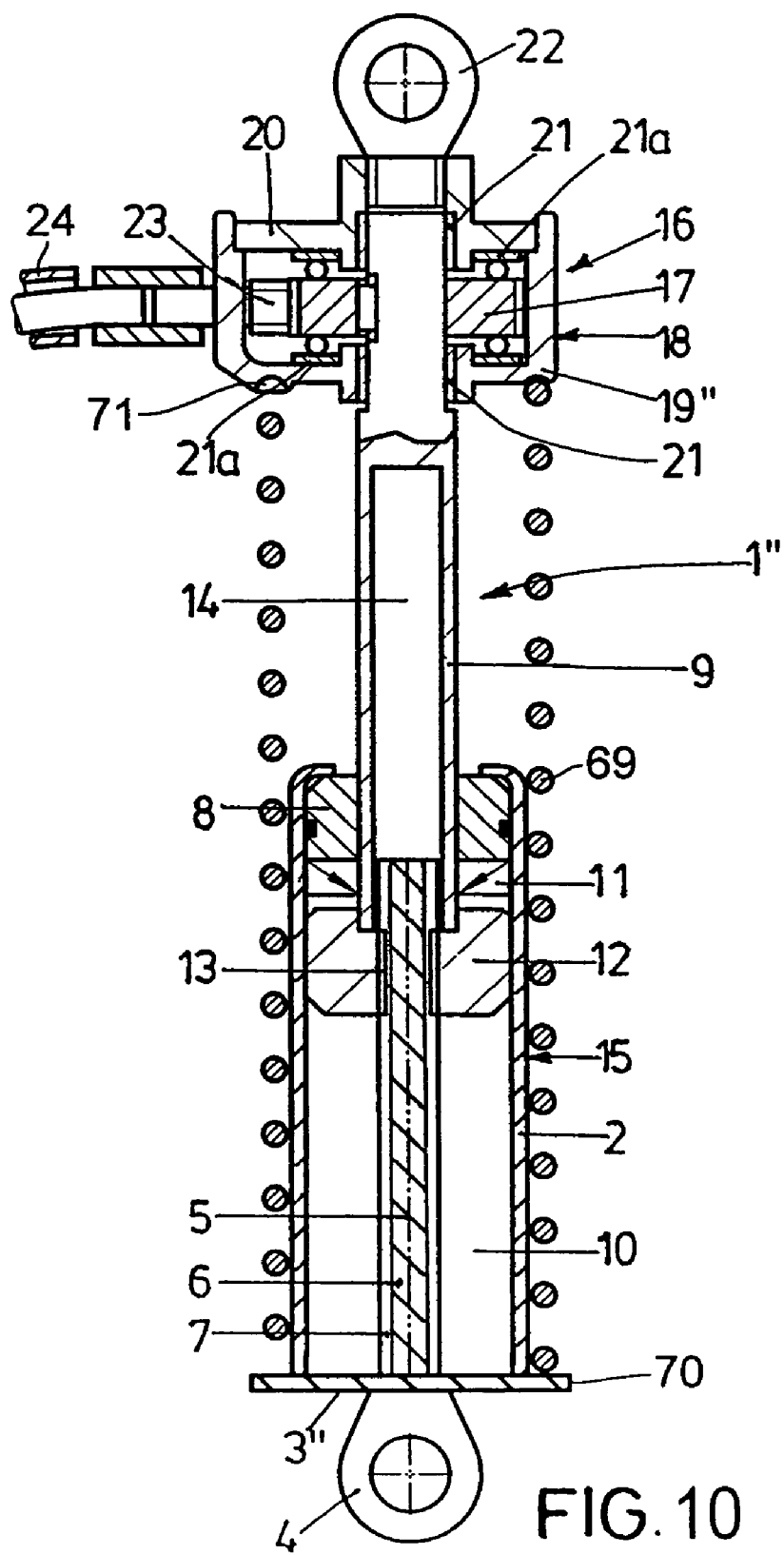
FIG. 10 is a view of an actuation element modified as compared to the embodiment according to FIGS. 3 and 4.

The actuating element 1" of FIG. 10 differs from that of FIGS. 1 and 2 in that a helical compression spring 69 is disposed between the bottom 3" and the cup-shaped casing member 19", partially or completely effecting the motion of extension of the piston rod 9. Using such a helical compression spring 69 may be suitable in particular when the actuating element 1" is subject to strong temperature fluctuations that lead to considerable fluctuations in pressure of the compressed gas within the interior space 10. The characteristics of these helical compression springs 69 is by far less temperature-dependent. In a borderline case, the gas pressure in the interior space 10 of the casing 2 may be approximately atmospheric pressure i.e., no compressed gas is inside the interior space 10. In this case, the piston rod guide 8 need not be sealed towards the casing 2, nor is there any need of a seal 11. Two energy storage devices, namely the gas spring 15 and the spring 69, or only a single energy accumulator, namely the spring 69, may be available in this actuating element 1". As for the rest, the above description applies. Such a design that includes a helical compression spring may of course also be provided in the exemplary embodiments specified above.

For the spring 69 to be reliably supported, an abutment 70 in the form of a rim is provided on the bottom 3" and a corresponding abutment 71 in the form of a recess is provided on the cup-shaped casing member 19". In this connection it is of decisive importance that the spring 69 acts between the casing 2 and the piston rod 9.

Figures 11, 12:
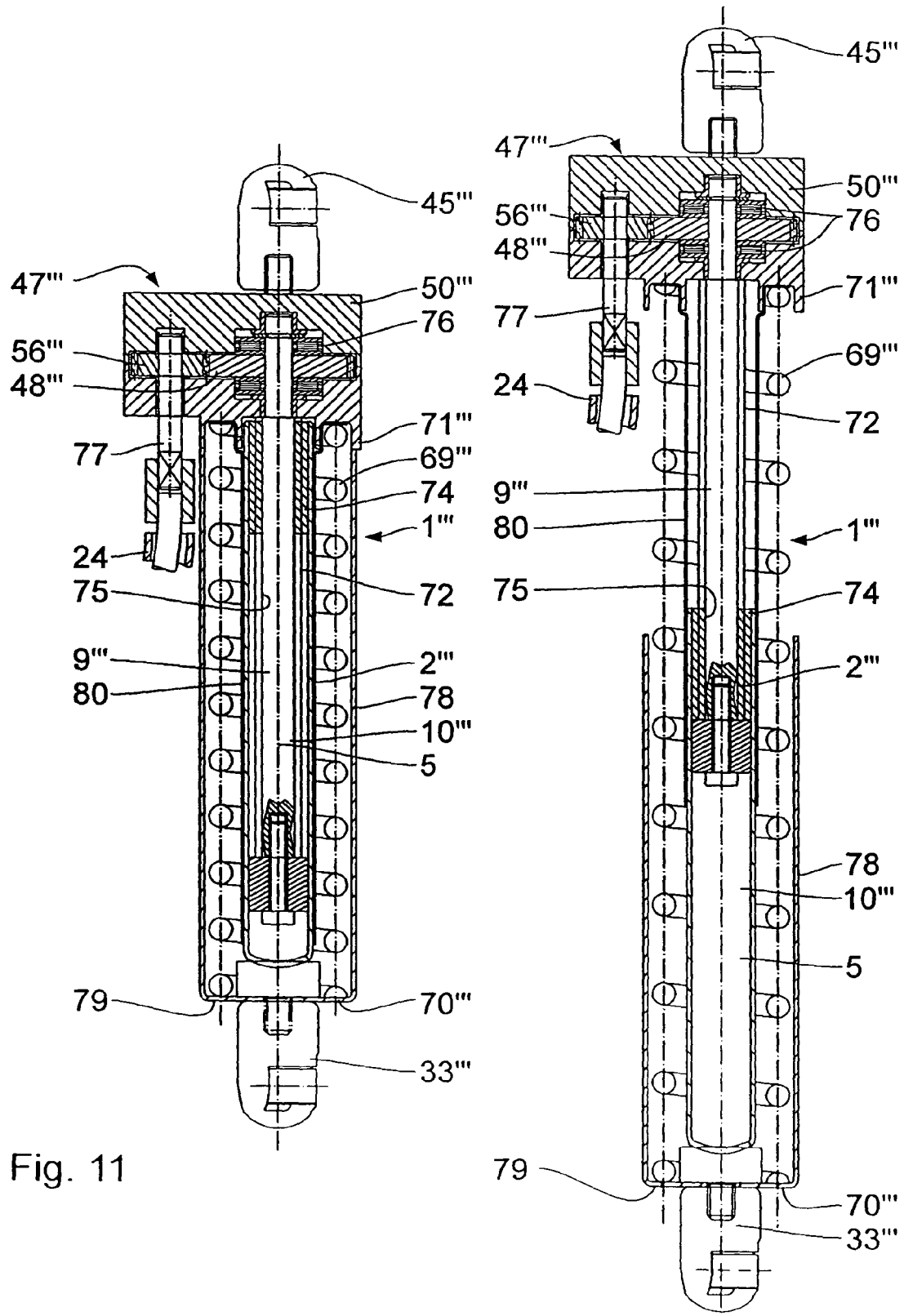
FIG. 11 is a longitudinal sectional view of another embodiment of an adjustable-length actuating element in the retracted condition.
FIG. 12 is a view of the actuating element of FIG. 11 in the extended condition.

The actuating element 1''' of FIGS. 11 and 12 does not comprise a gas spring, but only a helical compression spring 69''' as an energy accumulator. It has a casing 2''', on the bottom end of which a fastening element 33''' is non-rotatably mounted. Disposed for displacement in the interior space 10'' of the casing 2''' is a piston rod 9''' in the form of a threaded spindle which is provided with an external thread 72. On the end inside the interior space 10''' of the casing 2''', this piston rod 9''' is provided with a piston 73 which is a pure guide piston bearing against the inside wall of the casing 2'''. A threaded bush 74 is fixed inside the casing 2''' to the end thereof that faces away from the fastening element 33''', having an internal thread 75 that the external thread 72 of the piston rod 9''' engages with.

A toothed gearing 47''' is mounted on the piston rod 9''' on the free end thereof that is turned away from the casing 2''', comprising a frontal gearwheel 48''' which is non-rotatably joined to the piston rod 9''' that serves as a spindle; a pinion 56''' engages with the frontal gearwheel 48'''. The frontal gearwheel 48''' is located by means of bearings 76 in a gear casing 50''' on which a fastening element 45''' is non-rotatably mounted. As in the embodiment according to FIGS. 3 and 4, the pinion 56''' is provided with a drive clutch pin 77 which may for example be coupled with a flexible shaft 24.

A protecting tube 78 is connected with the casing 2''' in the vicinity of the end that faces away from the toothed gearing 47''', with a helical compression spring 69''' supporting itself on the bottom 79 of the tube 78. Consequently, the bottom 79 serves as an abutment 70''' for the helical compression spring 69'''. By its other end, the spring 69''' bears against a corresponding abutment 71''' on the gear casing 50'''. As can be seen from the above specification, the actuating element 1''' is non-rotatable after the fastening elements 33''', 45''' have been fixed for example according to FIGS. 7 and 8, which implies that also the protecting tube 78, the gear casing 50''', the helical compression spring 69''' and the casing 2''' are non-rotatable one relative to the other. Only the piston rod 9''' that serves as a spindle is able to rotate. There being no compressed gas inside the interior space 10''' of the casing 2''', any motion of extension of the piston rod 9''' from the casing 2''' is supported only by the helical compression spring 69'''. For protection of the piston rod 9''', which is provided with an external thread 72 and serves as a spindle, provision is made for another protecting tube 80 which is disposed between the spring 69''' and the piston rod 9''' and which is fixed between the spring 69''' and the gear casing 50'''. At its end turned towards the casing 2''', this protecting tube 80 envelops the casing 2'''. This design is largely indifferent to temperature. Otherwise, the above description applies.

What is claimed is:

1. An adjustable-length actuating element, comprising
an energy storing device (15, 46, 46', 69, 69''');
a casing (2, 28, 2''');
a piston rod (9, 9', 39, 39', 9''') which is extended from the casing (2, 28, 2''') and movable relative thereto and has an external end;
a first fastening element (4, 33, 33''') on the end of the casing (2, 28, 2''') opposite to where the piston rod (9, 9', 39, 39', 9''') exits; and
a second fastening element (22, 45, 45''') on the external end of the piston rod (9, 9', 39, 39', 9''');
a spindle drive which is integrated in the energy storing device (15, 46, 46', 69, 69''') and disposed between the casing (2, 28, 2''') and the piston rod (9, 9', 39, 39', 9'''); and
a driving shaft (24, 26a), which is in rotary driving connection with the piston rod (9, 9', 39, 39', 9''').

2. An adjustable-length actuating element according to claim 1, wherein a gear (16, 16', 47, 47', 47''') is provided between the driving shaft (24) 26a) and the piston rod (9, 9', 39, 39', 9''').

3. An adjustable-length actuating element according to claim 2, wherein the gear is a worm gear (16, 16').

4. An adjustable-length actuating element according to claim 2, wherein the gear is a toothed gear (47, 47''').

5. An adjustable-length actuating element according to claim 2, wherein the gear (16, 16', 47''') is axially tightly joined to the piston rod (9, 9', 39', 9''').

6. An adjustable-length actuating element according to claim 2, wherein the gear (47) is axially tightly joined to the casing (28).

7. An adjustable-length actuating element according to claim 1, further comprising an overload clutch provided in rotary driving connection between the driving shaft and the piston rod.

8. An adjustable-length actuating element according to claim 7, wherein the overload clutch is a slip clutch (58).

9. An adjustable-length actuating element according to claim 2, wherein the spindle drive and the gear (16, 16', 47, 47''') are not self-locking.

10. An adjustable-length actuating element according to claim 1, wherein the driving shaft (24) is connected to a motor (26).

11. An adjustable-length actuating element according to claim 1, wherein a motor (26) is fixed to the casing (28).

12. An adjustable-length actuating element according to claim 1, wherein the energy storing device is a gas spring (15, 46, 46'), the casing (2, 28) of which has an interior space (10, 37) filled with compressed gas and from the casing (2, 28) of which the piston rod (9, 9'; 39, 39') is sealingly extended.

13. An adjustable-length actuating element according to claim 1, wherein the energy storing device is a compression spring (69, 69''') which is disposed between the first fastening element (4, 33''') and the second fastening element (22, 45''').

14. An adjustable-length actuating element according to claim 13, wherein the compression spring (69''') is disposed at least partially in a protecting tube (78).

15. An adjustable-length actuating element according to claim 2, wherein at least one of the spindle drive and the gear (16, 16', 47) is self-locking.

* * * * *